June 24, 1952 W. V. STACKHOUSE 2,601,420
HOSE CLAMP
Filed Aug. 13, 1949

INVENTOR.
WILLIAM V. STACKHOUSE
BY William R. Lane
ATTORNEY

Patented June 24, 1952

2,601,420

UNITED STATES PATENT OFFICE 2,601,420

HOSE CLAMP

William V. Stackhouse, Redondo Beach, Calif., assignor to North American Aviation, Inc.

Application August 13, 1949, Serial No. 110,181

5 Claims. (Cl. 24—19)

This invention pertains to a hose clamp. The invention more particularly pertains to a clamp which uniformly applies pressure to the circumference of the members being attached.

It is an object of this invention to provide a clamp which is readily applied to the objects to be fastened therewith.

It is a further object of this invention to provide a clamp which applies pressure uniformly to the circumference of the members being attached.

It is still another object of this invention to provide fastening means for a clamp having new and novel aligning features and fastening means.

It is still another object of this invention to provide an arrangement which may be readily assembled or disassembled.

Other objects of invention will become apparent from the following description taken in connection with the accompanying drawings, in which Fig. 1 is an elevational view, with the hose shown in section;

Figure 2:
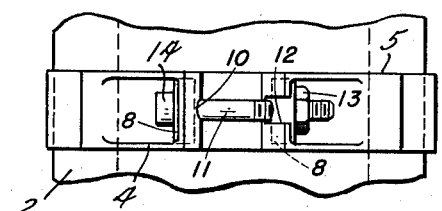
Fig. 2 is a top plan view of the invention, in position on the hose.
Figure 1:
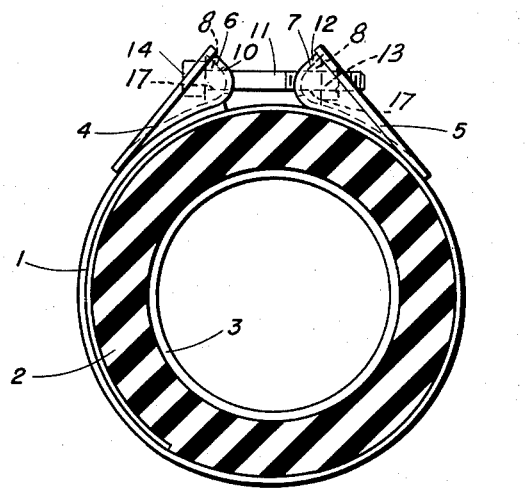
Figure 3:
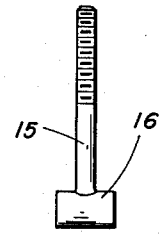
Fig. 3 is a plan view of an alternative bolt used with the invention.
Figure 5:
Figs. 5 and 6 are side and end views of a socket member.
Figure 6:
Figure 4:
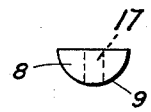
Fig. 4 is a side view of a self-aligning member.
Figure 8:
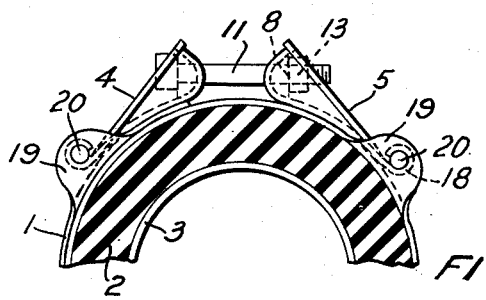
Fig. 8 is a fragmentary side elevational view, with the hose shown in section, of the clamp with the socket members pivotally mounted.
Figure 7:
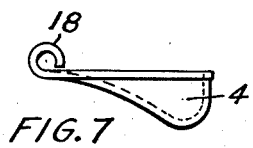
Fig. 7 is a side view of a socket member for pivotal mounting.

Referring to the drawings, the clamp comprises a strap 1 for fastening hose 2 to a conduit member 3. It is desirable, of course, that pressure be applied uniformly to the circumference of the hose so as to have the same properly engage the member to which it is fastened. To accomplish this purpose there are fastened to strap member 1 a pair of members 4 and 5. The fastening may be accomplished by welding, riveting, or the like, or the members may be suitably pivotally connected to the strap pins if desired. Fig. 7 illustrates member 4 modified for such a connection and members 4 and 5 are shown pivotally installed on strap 1 in Fig. 8. To accomplish this pivotal connection socket members 4 and 5 may be provided with rolled end portions 18. Tabs 19 may be attached to strap 1, preferably by being integral therewith and bent up at right angles to the surface of the strap. Pins 20 fit through the tabs and ends 18, thus pivotally holding members 4 and 5 to the strap. Members 4 and 5 are provided with socket portions 6 and 7, respectively, for receiving sectors 8 having curved portions 9 for self-alignment therein. Each sector is provided with an aperture 17 for receiving bolt 11. Member 4 is provided with an elongated opening 10 to permit bolt member 11 to pivot therein when the hose clamp is being tightened. Member 5 is provided with a cutout portion 12 whereby bolt 11 may be positioned in the bracket without removing nut 13 therefrom. Bracket 4 may be provided with a similar cutout portion 12 if so desired. If both bracket members are provided with cutout portions 12, bolt 11 with members 8 and nut 13 applied thereto may be placed in assembled position on the clamp merely by sliding the stem on the bolt into the recess 12. Bolt 11 may be provided with an ordinary head 14 or, if it is desired to eliminate one of the members 8, this may be done by using a T-bolt 15 having a rounded laterally extending portion 16, as illustrated in Fig. 3.

Although the invention has been described and illustrated in detail, it is to be clearly understood that the same is by way of illustration and example only and is not to be taken by way of limitation, the spirit and scope of this invention being limited only by the terms of the appended claims.

I claim:

1. A hose clamp comprising a flat strap member adapted to overlappingly circumscribe a cylindrical member; a pair of brackets secured to and carried by said strap member, each bracket including a base wall, portions of which are mounted adjacent said strap member with the forward end portion arcuately inclined rearwardly, and a pair of laterally spaced vertical side walls attached to the side edges of said base wall cooperating with said base wall to define a socket portion; a pair of aligning sectors, each of which is complementarily received within one of said socket portions, each of said aligning sectors and socket portions being provided with an aperture therethrough; and a bolt extending through said apertures interconnecting said brackets for clamping said strap member in operative position.

2. A device as recited in claim 1 in which the apertures in the socket portions comprise cutout portions for slidably receiving said bolt with said sectors thereon.

3. A device as recited in claim 1 in which the aperture in at least one of said socket portions comprises a cutout portion for slidably receiving said bolt with said sectors thereon.

4. A device as recited in claim 1 in which at least one of said brackets is pivotally connected to said strap.

5. A device as recited in claim 1 in which one of said sectors is integral with an end of said bolt.

WILLIAM V. STACKHOUSE.

REFERENCES CITED

The following references are of record in the file of this patent:

UNITED STATES PATENTS

| Number | Name | Date |
|---|---|---|
| 407,559 | Wells | July 23, 1889 |
| 429,979 | Thum | June 10, 1890 |
| 649,916 | Dietrich | May 22, 1900 |
| 830,110 | Spencer | Sept. 4, 1906 |
| 1,070,497 | Lewis | Aug. 19, 1913 |
| 1,277,398 | Elliott | Sept. 3, 1918 |
| 1,596,944 | Philbrook | Aug. 24, 1926 |
| 1,601,612 | Edwards | Sept. 28, 1926 |
| 1,621,490 | Bovey et al. | Mar. 22, 1927 |
| 1,629,246 | Arrington | May 17, 1927 |
| 2,283,179 | Buckingham | May 19, 1942 |

FOREIGN PATENTS

| Number | Country | Date |
|---|---|---|
| 340,160 | Great Britain | Dec. 24, 1930 |